June 6, 1933.　　　　V. BUSH　　　　1,912,358
APPARATUS FOR ESTABLISHING AN ARTIFICIAL DATUM
Filed April 8, 1929　　　3 Sheets-Sheet 3
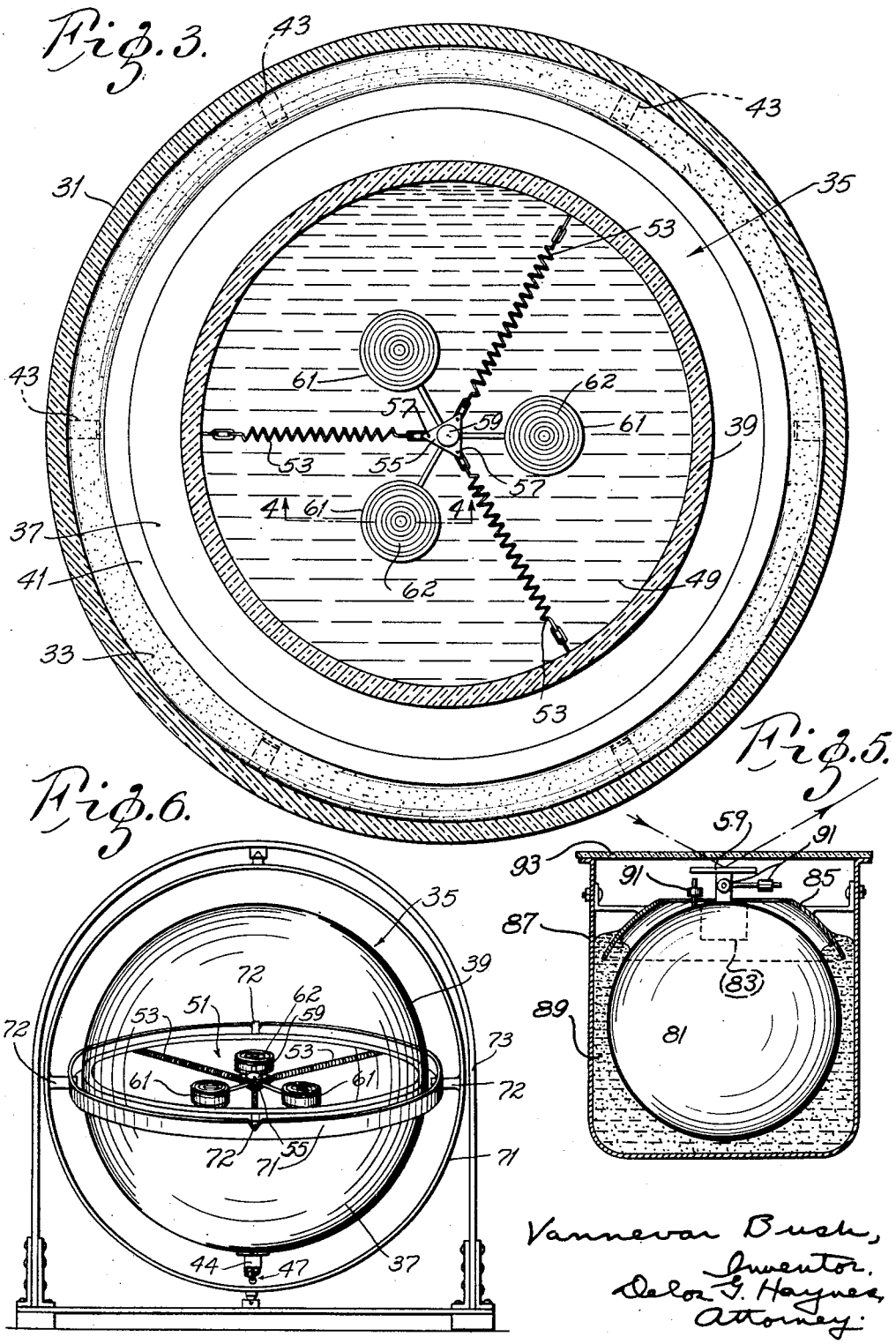

Patented June 6, 1933

1,912,358

UNITED STATES PATENT OFFICE

VANNEVAR BUSH, OF BELMONT, MASSACHUSETTS

APPARATUS FOR ESTABLISHING AN ARTIFICIAL DATUM

Application filed April 8, 1929. Serial No. 353,613.

This invention relates to means for establishing and maintaining a predetermined artificial datum, and with regard to certain more specific features, to means for maintaining such a datum on an accelerating or decelerating frame such as a conveyance, the datum referring to another frame of reference such as the earth.

Among the several objects of the invention may be noted the provision of an artificial datum frame which may be used for holding an object such as a horizontal mirror in a predetermined position on a moving conveyance, for use by way of example in the measurement by sextant of altitude of sun and stars in navigation, or which may be used in connection with devices for measuring ground speeds of airplanes, or in connection with airplane bomb sights, supports for gyro compasses and the like; the provision of a device of the class described which is effective to maintain accurately the said predetermined datum position without the complications and unreliability inherent in projected prior devices such as gyroscopically stabilized platforms, bubble sextants and others. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings in which are illustrated two of various possible embodiments of the invention, Fig. 1 is a trimetric view showing diagrammatically certain fundamental elements of a preferred form of the device;

Fig. 3 is a horizontal section taken substantially on line 3—3 of Fig. 2;

Fig. 5 is a cross section showing an alternative form of the invention preferably for use in airplanes; and, Fig. 6 is a diagrammatic view showing an alternative form of gimbal mounting.

Similar reference characters indicate corresponding parts throughout the several views of the drawings.

The present device is applicable to a variety of situations wherein a fixed datum line, plane or the like is required, which, in successive positions, is to remain substantially fixed in respect to earth levels and which is to be substantially unaffected as a datum by accelerations and decelerations of the body with which the datum is moving. For instance, there is need for a device of this nature which will provide for taking accurate readings for navigation purposes when the horizon is obscured or when the elevation above sea level is not accurately known. Under these conditions, what is known as an artificial horizon could advantageously be used comprising a constantly horizontal reflecting plane.

Broadly, the present device comprises a body balanced in neutral equilibrium in a fluid of such density that the body neither tends to float nor sink to an appreciable degree. There is also substantial coincidence between the center of buoyancy of the body and its center of mass, so that accelerative and decelerative forces have substantially no tendency to apply torque to displace or tilt the body. A weak oscillating force is permitted to bear upon this body, tending in the mean over a relatively long interval to orient it at a predetremined position, but so weak is this force that momentary departures in direction produce only negligible effects upon the body.

Figure 1:
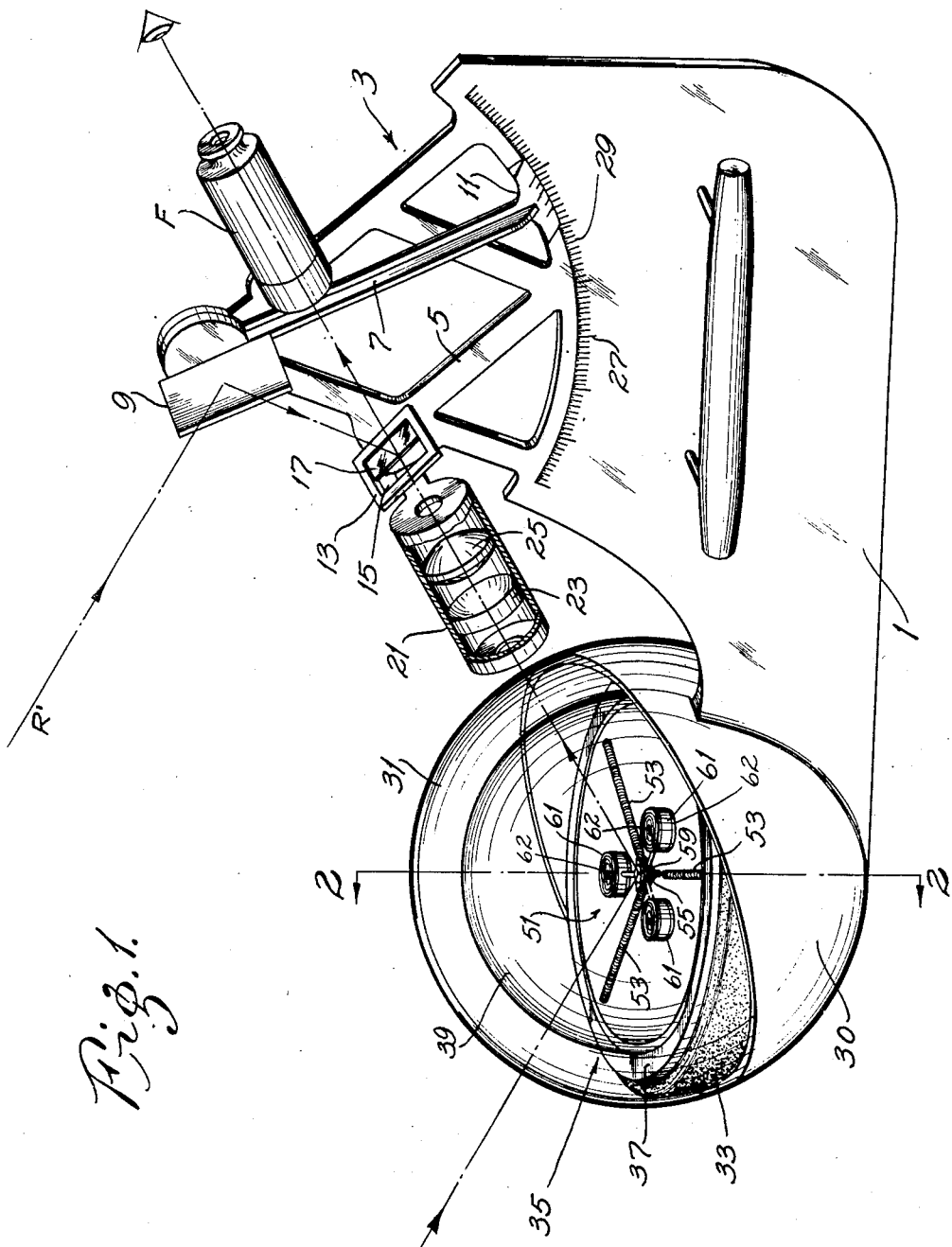

Referring now more particularly to Fig. 1, which illustrates the application of the device to an artificial horizon construction, there is illustrated at numeral 1, a main frame, the integral part 3 of which comprises a sextant. The sextant includes the sextant frame 5 which is integral with the frame 1, a movable index arm 7, an index glass 9 and index vernier 11. Fastened to the frame 5 is fixed the plane horizon glass 13, the upper half 15 of which is transparent and the lower half 17 of which comprises a speculum metal or other mirror reflecting into a telescope F, also fixed to the frame 5. The telescope F is aligned with a tube 21 which supports a concave lens 23 and a convex lens 25, the functions of which will be described hereinafter. The divisions 27 on the arc scale 29 read in full degrees, representing full degrees of the elevation of the object sighted, as is the case when a sextant is used with an artificial horizon. This is well known from the operation of sextants on land with artificial horizons such as pools of mercury.

The frame 1, with which the sextant 5 is integral, includes a hemispherical portion 30 capped by a hemispherical portion 31 composed of glass. Within the lower hemisphere, which is composed of steel or like material to avoid appreciable amalgamation, is carried a small quantity of mercury 33, within which is floated an inner spherical container member 35. The container 35 thus has universal movement about its center within the remainder of the apparatus. In order that the spherical member 35 may float upright it is made to comprise a lower metal hemisphere 37 (see Fig. 2) capped by an upper glass hemisphere 39. Over the lower metal hemisphere 37 is placed a liquid-tight and larger metal hemisphere 41. Spring spacers 43 fastened to the outer hemisphere 30 serve to space the inner hemisphere and at the same time permit relative movement. Between the inner hemispheres 37 and 41 on the vertical lines of symmetry of the spherical member 35, taken as a whole, is located an expansion chamber 44 communicating with the interior of the sphere 37, 39 by way of a trap tube 45. Associated with, and on the expansion chamber 44, is a pair of laterally and longitudinally movable threaded weights 47 for providing fine adjustment of the floating position of the inner spherical member 35. The weights are chosen so that the member 35 floats in mercury with the surface of the mercury not quite covering the lower hemisphere. They hang down by gravity and are so adjusted as to maintain the equator of the sphere horizontal when there is no disturbance.

Figure 2:
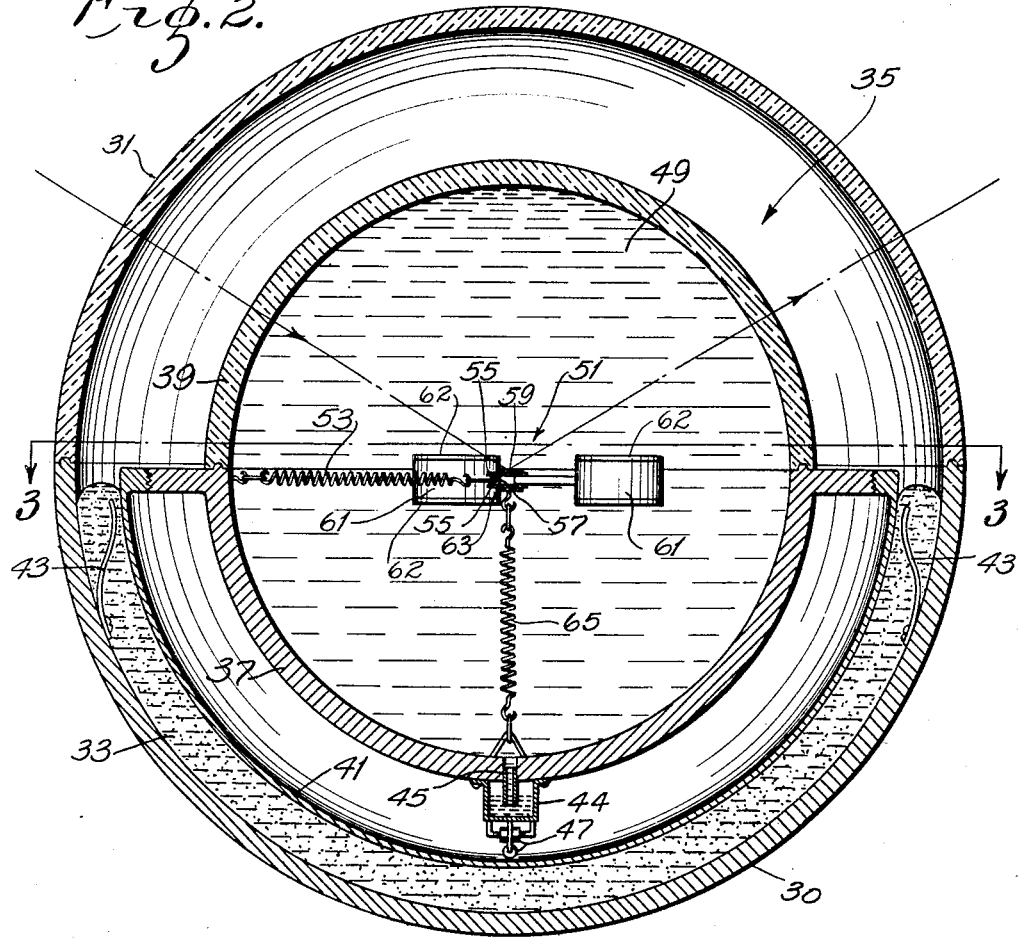
Fig. 2 is a cross section taken through certain supporting spheres shown in Fig. 1, the section being taken substantially along line 2—2 of Fig. 1.

As illustrated in Fig. 2, the upper inner hemisphere 39 and the lower inner hemisphere 37 form a smooth internal hollow and spherical surface, the sphere being completely filled by a transparent non-freezing, non-viscous liquid 49, such as ether or carbon tetrachloride. Fig. 2 illustrates how the level of the liquid in the expansion chamber is brought to a point well above the lower edge of the trap tube 45 so that the sphere remains full of liquid despite expansions and contractions due to temperature changes.

From the above it will be seen that when this device is mounted on shipboard, airplane or other vehicle, that tilting action of the frame 1 is not substantially transmitted to the inner spherical chamber 35, but horizontal accelerations and decelerations will cause this chamber 35 to tilt slightly. This is because its center of gravity is lower than its center of buoyancy and forces due to accelerations and decelerations act over the moment arm between the center of buoyancy and the center of gravity so as to apply a torque. On shipboard in rough weather, if the device is not mounted at the center of roll, the rolling of the ship will, by reason of the horizontal accelerations produced, cause chamber 35 to tilt through an angle of several degrees, the motion of chamber 35 being oscillatory but with a long period, of several seconds, depending upon the size of ship. The average or mean position of chamber 35 will however be with the equator horizontal, except when the ship is being accelerated as during starting, stopping or turning.

In order to cancel the effects of acceleration and deceleration there is provided within and at the center of the chamber 35, balanced in the contained liquid, a symmetrical body 51, held in central position by light springs 53 which reach to and are fastened at the inner wall of the container 35. The springs 53 are arranged and articulated to hold the body 51 horizontally. The body 51 comprises spaced triangular plates 55 separated by spacer posts 57 to which are attached the springs 53. As will be noted from Fig. 2, the springs are attached to the central triangle and the sphere by fine wire links forming substantially frictionless hinges. The upper plate carries a horizontal mirror 59 which serves as an artificial horizon in the manner which will be reviewed hereinafter. The symmetrical body 51 and attached mirror 59 since thus positioned have their combined center of gravity close to the central point of sphere 35 wherein they are positioned, and which central point is also the center of tilting of sphere 35. The effect of this is greatly to minimize any effect on the body 51 and mirror 59 by forces of acceleration, deceleration or centrifugal force. The positioning of the mirror and its attached body in this manner, combined with the large moment of inertia of the suspended mirror system including the body, and the buoying effect of the surrounding liquid medium, all cause the mirror to have a very long natural period of vibration, as contrasted with the relatively short period of prior devices. The mirror of this invention is therefore capable of maintaining a more accurately level position when the instrument is subjected to acceleration, deceleration and centrifugal force, than are the mirrors of prior devices. In particular the buoyant action of the liquid meduim surrounding the mirror is effective in reducing the ratio existing between the effective weight of the mirror and its moment of inertia. By thus reducing effective weight in comparison to moment of inertia, the natural period of vibration of the mirror is lengthened.

The system of springs 53 may have various other arrangements. Thus four springs may be used at the vertices of a tetrahedron, and may have tetrahedral symmetry. In this case the net buoyancy of body 51 should be zero, that is, the density of the medium in which the body 51 is suspended is the same as the net density of body 51.

The preferred arrangement for completing the triangular body 51 shown in the drawings is to fasten symmetrically three hollow metal chambers 61. These are fastened by light rods as shown.

The chambers 61 are completely filled with a liquid of lower density than that in sphere 35. For example in sphere 35 carbon tetrachloride, may be used and in chambers 61 of body 51 benzine. The amount and weight of metal in body 51 is then chosen so that the whole when immersed in sphere 35 has very slight buoyancy. In some arrangements the buoyancy may be zero, or slightly negative, depending on the spring arrangement. The mirror is counterweighted as illustrated at numeral 63. Precautions should be taken in the construction to maintain substantial symmetry. Also, in the preferred form it is desirable that a light anchoring spring 65 be used when there is a slight buoyancy of the body 51.

Figure 4:
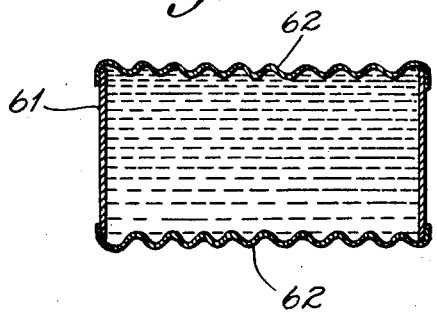
Fig. 4 is an enlarged cross section taken on line 4—4 of Fig. 3 and shows a substantially neutrally equilibrated chamber.

As illustrated in Fig. 4, the chambers 61 are thin metal cylinders, the top and bottom consisting of corrugated thin metal discs 62. These are all of identical thickness and shape. The liquid in chambers 61 and that in sphere 35 are chosen to have nearly the same thermal coefficient of expansion. Carbon tetrachloride and benzine are satisfactory, but some improvement is produced by adding to each small amount of liquid hydrocarbons. If the coefficients are identical, and if the buoyancy at one temperature is small, the buoyancy at other reasonable temperatures will be small and nearly the same. The expansion of the metal itself produces a small error, but this is compensated for by a slight difference in the expansions of the two liquids.

If it be supposed that the body 51 and the sphere 35 be horizontal, and that the sphere 35 then be tilted through a small angle and then back to position, the body 51 will practically not move. If the sphere 35 then be tilted through a small angle in the opposite direction, the same result will be had with the additional effect that any movement assumed by the body 51 will be compensated for. The body 51 can be acted upon only by reason of forces transmitted from sphere 35 and not by accelerative forces directly. Torque can be thus transmitted only through the liquid by reason of its viscosity or through the negligible action of the springs. The viscosity effect is negligible and can be decreased to any desirable or necessary degree by increasing the size of the sphere 35 and decreasing the size of the body 51 as a whole. Thus the only appreciable torque effect is that transmitted by the springs and this is small, inasmuch as the springs are easily bendable laterally.

In respect to the springs, it will be noted that the vertical one is attached substantially at the center of mass, and hence produces no appreciable turning moment on body 51. The other springs are also attached close to the center of mass and produce little moment. Inasmuch as the body 51 with its contained fluid has a large moment of inertia, the bendable springs can move the body 51 only slowly. During a single oscillation of the ship, or thus to a smaller degree of sphere 35, they can move it only an inappreciable amount. Their net effect over long intervals of time is to hold the body 51 in alignment with the average position of the sphere 35, and hence to maintain the mirror substantially horizontal at least to degree proper for the readings to be taken by means of rays impinging on the mirror.

Fig. 1 shows diagrammatically a suitable optical arrangement between the sextant and datum apparatus per se. Rays of light R and R' from the heavenly body are brought together by reflection at mirrors 59 and 13 and into the telescope F and the two images are caused to coincide when the elevation is read at the scale. The full angle of elevation, not half the angle, as is the case with a sextant working with the real horizon, is read. For this reason the construction shown is given a larger angular scale than the ordinary sextant, so that the elevations of bodies close to the zenith may be observed.

In using an artificial horizon constructed as above for measuring altitudes of heavenly bodies in navigation it should be noted that the light passing into spheres 31, 35 to the mirror 59 and out is effectively passing through a set of spherical lenses. This must be corrected for in designing the optical system of the device. Lenses 23 and 25 compensate for the lens effect of the spheres and allow the two images to be focused simultaneously and give the same magnification to each. The details regarding the passage through the lenses of the light rays as expanding and contracting bundles are not shown in the drawings, because the laws regarding them are well known. Abberation effects of the lenses are ordinarily negligible and if not so under particular conditions may be corrected for, as is also well known to the art.

Under certain conditions it may be found desirable to fill the space above the member 35 with carbon tetrachloride, with an expansion chamber in the hemisphere 31, similar to the one described on sphere 35. In the embodiment shown, only air is used above the mercury. When this carbon tetrachloride filler is used, only the external surface of the sphere 31 need be optically accurate. This is because the indices of refraction of glass and carbon tetrachloride, are nearly the same, so that the accuracy of the interfaces is relatively unimportant.

It is to be understood that I have not shown all of the accessories that might be added to the device, such as sun glasses, a clamping tangent screw and/or others.

It will be noted that the springs 43 comprise a resilient connection between the container 35 and the body 51. It is to be understood that the resilient connection or articulation can otherwise be effected, such as by magnetic or electrical devices.

For airplane use, a simplified modification or form of the invention will operate satisfactorily and this is shown in Fig. 5. The reason for the possibility of simplification is that the accelerations encountered on a plane are of shorter duration than on a ship, and also because precision which is ample for plane navigation is much less than is required for work at sea. Thus, for airplane use with sufficient care in construction it is sufficient to use only a sphere floating in mercury.

Referring to Fig. 5, numeral 81 represents a solid non-magnetic metal sphere, not affected by stray fields, built of metal which is not wet by mercury, or it is covered with a thin coating of lacquer to prevent such wetting. The sphere is substantially accurately true. This sphere is provided with a counterbore 83 on the top so that it will float upright in mercury.

The counterbore 83 is filled with a lighter material such as fibre so that the parts hereinafter to be described may be fastened. A piece of platinum 85 is mounted on the side of a container 87 inside of which the sphere 81 floats in a pool of mercury 89. The platinum piece 85 is carefully wet with some mercury. Platinum has the property of being wet by mercury but of dissolving to an inappreciable extent therein. The piece 85 is preferably shaped to but spaced from a portion of the spherical surface of the sphere 81.

In view of the above, between the piece 85 and the sphere 81 the surface of the mercury will be as shown. The surface of the mercury will not rise as high between members 81 and 85 as it will outside of the piece 85, that is, between the piece 85 and the container 87. It is depressed at the surface of the sphere 81. Due to surface tension effects this produces forces which tend to retain the ball or sphere 81 centered. The sphere is therefore only in contact with liquid. Moreover, all the forces due to the pressure of liquid acting normally to its surface act also in a direction which passes through the center of the ball.

On the top of sphere 81 is mounted the mirror 59 which is utilized with an attached or separate sextant, as disclosed hereinbefore. Three small screws 91 are provided for leveling the ball in two directions and for adjusting the center of gravity. The center of gravity is adjusted to be slightly below the center of the ball. It is hence of long period, and short-period accelerations affect it only inappreciably. Horizontal accelerations also do not force the ball A against the sides of the vessel but merely cause temporary changes in the mercury levels.

The top of the container is closed by means of an optically plane sheet of glass 93 which is sealed on. The space above the ball is previously filled with an inert gas such as nitrogen so that the mercury surface does not become contaminated. It is preferable that the mercury be prepared and maintained of very high purity, that is, that which is used for floating the sphere 81.

In Fig. 6 is diagrammatically shown a modified form of mounting for the chamber 35 shown in Figs. 1 and 2 in which the lower hemispherical sheath is removed, leaving the adjusting weights 47 and expansion chamber 44 exposed. The spherical chamber 35 is then mounted in stable equilibrium within a pair of articulated gimbal rings 71, the inner body 51 remaining in neutral equilibrium within liquid in the sphere 35. The gudgeons 72 of the sphere and the gimbals are mounted, one on another, by knife edge bearings as used in scales, which operate substantially without friction. The frame 73 in which the gimbals are mounted may carry the sextant elements or the sextant may be used separately but in conjunction with this device as a datum. It will be seen that the same type of articulation is had between the frame and the sphere as in the preferred form. In both cases the articulation is accomplished by what may be referred to as a universal coupling.

It is to be noted that unlike gyroscopic devices, this one provides a level datum at all points on the earth's surface. This is true, because as the curvature of the earth is traversed, the stably equilibrated container 35 maintains a predetermined position with respect to the radii of the earth. This is due to the action of gravity on the stably equilibrated member 35. Hence the mirror always remains in a predetermined position with respect to these radii, that is, it remains level. However, it does not substantially respond to local oscillations.

In view of the above, it will be seen that the several objects of the invention are achieved and other advantageous results attained.

As many changes could be made in carrying out the above constructions without departing from the scope of the invention, it is intended that all matter contained in the above description or shown in the accompany drawings shall be interpreted as illustrative and not in a limiting sense.

I claim:

1. In apparatus of the class described, a body suspended in a medium of substantially the same density as the net density of the body and a container for the medium indirectly oscillable on a moving frame, said body and said container being articulated by means tending to hold the body in a mean position corresponding to the mean of positions assumed by the container when it oscillates the said suspended body including an optical reflecting portion, the said medium being transparent, and the said container being transparent at least in part, whereby the said reflecting portion within the container is adapted to serve as an artificial horizon.

2. In apparatus of the class described, a body suspended in a medium of substantially the same density as the net density of the body and a container for the medium indirectly oscillable on a moving frame, said body and said container being articulated by means tending to hold the body in a mean position corresponding to the mean of positions assumed by the container when it oscillates, a support which is directly oscillable with said moving frame for supporting the container and a connection between said support and container adapted to permit substantially free relative movement the said suspended body including an optical reflecting portion, the said medium being transparent, and the said container being transparent at least in part, whereby the said reflecting portion within the container is adapted to serve as an artificial horizon.

3. In apparatus of the class described, a body suspended in a medium of substantially the same density as the net density of the body and a container for the medium indirectly oscillable on a moving frame, means for articulating said body and said container and for holding the body in a mean position corresponding to the mean of positions assumed by the container when it oscillates, a support which is directly oscillable with said moving frame for supporting the container and a connection between said support and container adapted to permit substantially free relative movement, said connection comprising a gimbal mounting for the container on the support the said suspended body including an optical reflecting portion, the said medium being transparent, and the said container being transparent at least in part, whereby the said reflecting portion within the the container is adapted to serve as an artificial horizon.

4. In apparatus of the class described a hollow body suspended in an external medium of predetermined density, said hollow body being filled with an internal medium adapted to make its net density including the internal medium equal to the density of the external medium, a container for the external medium, and means for articulating said body and said container and for holding the body in a mean predetermined position in respect to the container corresponding to the mean of positions assumed by the container when it oscillates the said suspended body including an optical reflecting portion, the said medium being transparent, and the said container being transparent at least in part, whereby the said reflecting portion within the container is adapted to serve as an artificial horizon.

5. In apparatus of the class described a body suspended in a medium of substantially the same density as the body, a container for the medium, and means for articulating said body and said container and for holding the body in a mean predetermined position in respect to the container corresponding to the mean of positions assumed by the container when it oscillates but the articulation being such that said predetermined mean body position follows the mean positions of the oscillating container the said suspended body including an optical reflecting portion, the said medium being transparent, and the said container being transparent at least in part, whereby the said reflecting portion within the container is adapted to serve as an artificial horizon.

6. In apparatus of the class described a body suspended in a medium of substantially the same density as the body, a container for the medium, and means for articulating said body and said container and for holding the body in a mean predetermined position in respect to the container corresponding to the mean of positions assumed by the container when it oscillates but the articulation being such that said predetermined mean body position follows the mean positions of the oscillating container, an oscillating support for the container and means for damping the oscillations transmitted from the support to the container the said suspended body including an optical reflecting portion, the said medium being transparent, and the said container being transparent at least in part, whereby the said reflecting portion within the container is adapted to serve as an artificial horizon.

7. In apparatus of the class described a hollow body suspended in an external medium of predetermined density, said hollow body being filled with an internal medium adapted to make its net density including the internal medium equal to the density of the external medium, a container for the external medium, and means for articulating said body and said container and for holding the body in a mean position corresponding to the mean of positions assumed by the container when it oscillates, said articulating means comprising at least one spring joining the container and the body the said suspended body including an optical reflecting portion, the said medium being transparent, and the said container being transparent at least in part, whereby the said reflecting portion within the container is adapted to serve as an artificial horizon.

8. In apparatus of the class described a datum-establishing body suspended in a medium of substantially the same density as the net density of the body, said body having substantially coinciding centers of mass and buoyancy and a container for the medium the said suspended body including an optical reflecting portion, the said medium being transparent, and the said container being transparent at least in part, whereby the said reflecting portion within the container is adapted to serve as an artificial horizon.

9. In apparatus of the class described a body suspended in a medium of substantially the same density as the net density of the body, said body having substantially coinciding centers of mass and buoyancy and a container for the medium, and means for articulating said body and said container and for holding the body in a mean position corresponding to the means of positions assumed by the container when it oscillates the said suspended body including an optical reflecting portion, the said medium being transparent, and the said container being transparent at least in part, whereby the said reflecting portion within the container is adapted to serve as an artificial horizon.

10. In apparatus for providing a horizontal reference plane on a moving conveyance comprising a medium, a body including an optical portion suspended in neutral equilibrium in said medium, a container at least partially transparent for holding said medium, a resilient articulating means between the container and said body tending to hold the body in a mean position corresponding to the mean of positions assumed by the container when it oscillates, optical means located externally of the container adapted to cooperate optically with said optical portion of the body and universal coupling means connecting the external optical means with the container adapted to permit relative universal movement without destroying said optical cooperation.

11. In apparatus for maintaining a traveling datum-establishing body substantially fixed with respect to earth levels, the combination comprising a container, means for supporting the container for tilting movement under the influence of gravity, a medium within the container, a datum-establishing body within the container and largely supported by said medium, the container and the datum-establishing body being capable of relative movement, and elastic means for transmitting average tilting movement of the container to the datum-establishing body without transmitting rapidly fluctuating movements thereto the said datum establishing body including an optical reflecting portion, the said medium being transparent, and the said container being transparent at least in part, whereby the said reflecting portion within the container is adapted to serve as an artificial horizon.

12. In apparatus for maintaining a traveling datum-establishing body substantially fixed with respect to earth levels, the combination comprising a container, means for supporting the container for universal tilting movement under the influence of gravity, a medium within the container, a datum-establishing body within the container and largely supported by said medium, the container and the datum-establishing body being capable of relative movement, and means for transmitting average tilting movement of the container to the datum-establishing body without transmitting rapidly fluctuating movements thereto the said datum establishing body including an optical reflecting portion, the said medium being transparent and the said container being transparent at least in part, whereby the said reflecting portion within the container is adapted to serve as an artificial horizon.

13. In apparatus for maintaining a traveling datum-establishing body substantially fixed with respect to earth levels, the combination comprising a container, means for supporting the container for tilting movement under the influence of gravity, a medium within the container, a symmetrical datum-establishing body within the container and largely supported by said medium, the container and the datum-establishing body being capable of relative movement, and elastic means for transmitting average tilting movement of the container to the datum-establishing body without transmitting rapidly fluctuating movements thereto the said datum establishing body including an optical reflecting portion, the said medium being transparent, and the said container being transparent at least in part, whereby the said reflecting portion within the container is adapted to serve as an artificial horizon.

14. In apparatus for providing a predetermined reference datum on a moving frame, the combination of a datum-establishing body suspended in a medium of substantially the same density as the net density of said body, a container for the medium, and means for transmitting to the datum-establishing body average movement of the container without transmitting thereto rapidly fluctuating movements of the container the said datum-establishing body including an optical reflecting portion, the said medium being transparent, and the said container being transparent at least in part whereby the said reflecting portion within the container is adapted to serve as an artificial horizon.

15. Artificial horizon apparatus for providing a horizontal reference plane on a moving conveyance comprising a container, means for supporting the container for universal tilting movement with respect to the conveyance under the influence of gravity, a medium within the container, a symmetrical datum-establishing body, of substantially the same net density as the density of the medium, suspended in the said medium in the container, a reflecting surface on said body, elastic means for transmitting average tilting movement of the container to the suspended body, and a sextant adapted to receive reflected light from the said reflecting surface, said container being transparent at least in part.

16. In apparatus for providing a horizontal reference plane on a moving conveyance, the combination comprising a medium, a datum-establishing body suspended in neutral equilibrium in said medium, an optical surface movable with said body, a container for holding said medium, resilient articulating means for holding the body in a mean position corresponding to the mean of positions assumed by the container, said container being transparent at least in part, optical means adapted to cooperate optically with the said optical surface, and means for supporting said container to permit universal tilting movement thereof.

17. In apparatus for providing a reference plane on a moving conveyance, the combination of a substantially spherical shell, a fluid therein, a body totally immersed in said fluid and suspended centrally therein, and a mirror carried by the said body, said body being subjected to a force tending on the average to hold the mirror in a horizontal position, the inertial forces occasioned by movement of the body from a horizontal position being large compared to the said force to which the body is subjected, said fluid being transparent, and said shell being transparent at least in part, whereby the said mirror is adapted to serve as an artificial horizon.

18. In apparatus for providing a reference plane on a moving conveyance, the combination of a substantially spherical shell, a fluid therein, a body totally immersed in said fluid and suspended centrally therein, a mirror carried by said body, and a sextant and an optical system cooperating with the mirror, said body being subjected to a force tending on the average to hold the mirror in a horizontal position, the inertial forces occasioned by movement of the body from a horizontal position being large compared to the said force to which the body is subjected, said fluid being transparent, and said shell being transparent at least in part, whereby the said mirror is adapted to serve as an artificial horizon.

19. In apparatus for providing a reference plane on a moving conveyance, the combination of a container, a fluid therein, a body totally immersed in said fluid and subjected to a force tending on the average to hold the body in a horizontal position, the apparatus including a mounting for said body acting on the body at a point close to the center of mass thereof, the effective moment of inertia of the body in the fluid being large compared to the torque exerted by the restoring force, the said immersed body including an optical reflecting portion, said fluid being transparent, and the said container being transparent at least in part, whereby the said reflecting portion within the container is adapted to serve as an artificial horizon.

20. An optical instrument comprising a sextant, a container, means for mounting the container for universal tilting motion with relation to the sextant, the container being transparent at least in part, an optical reflecting element within the container, and means, including a body attached to the optical reflecting element, for yieldingly holding said element substantially level within the container at a point such that the center of gravity of the said body and optical reflecting element is relatively close to the center of tilting of the container, despite oscillating tilting of the container, the tilting effect on the said optical reflecting element of acceleration, deceleration and centrifugal force thus being minimized, the instrument including a transparent liquid which substantially fills said container, acting to buoy the said body and to transmit light coming through the transparent container to said element and to transmit the reflection thereof toward said sextant.

21. An optical instrument comprising a sextant, a closed container, means for mounting the container for universal tilting motion with relation to the sextant, the container being transparent at least in part, an optical reflecting element within the container, and means, including a body attached to the optical reflecting element, for yieldingly holding the said element substantially level within the container despite oscillating tilting of the container, the instrument including a transparent liquid which completely fills said container acting to buoy said body and to transmit light coming through the transparent container to said reflecting element and to transmit the reflection thereof toward said sextant, the container including means for accommodating expansion of the said liquid.

22. An optical instrument comprising in combination a container, including a hemispherical top which is transparent at least in part, an optical reflecting element positioned within said container, levelling means for holding the reflecting element level within the container, said means including a body carrying the reflecting element, means for mounting the container with freedom of motion with relation to said body and reflecting element to tilt universally about a point close to the center of gravity of the reflecting element and said body, the effect of acceleration, deceleration and centrifugal force on the reflecting element and said body thus being minimized, the instrument including a liquid medium substantially filling the said container and surrounding said reflecting element and body, the said liquid being transparent so as to permit of the transmission of light through the container to the reflecting element and the transmission of the reflection of said light through the liquid and transparent container.

23. An artificial horizon having therein a movable body including a mirror surface adapted to reflect light from a distant body and a transparent liquid medium surrounding and covering the said mirror, said movable body being suspended for movement about a location close to its center of gravity thereby to impart to the mirror a long natural period of vibration.

24. An artificial horizon having therein a movable body including a horizontal mirror surface adapted to reflect light from a distant body, characterized in that the said movable body is suspended for movement about a location close to its center of gravity against a restoring force, and is totally immersed in a transparent liquid medium, the restoring force acting to position the mirror surface being small in comparison to the effective moment of inertia of said movable body whereby said mirror surface is caused to have a long natural period of vibration.

25. An artificial horizon comprising a container, a transparent liquid medium therein, a mirror totally immersed in said liquid medium and suspended therein subject to the action of a leveling force, said container being transparent in places appropriate to direct access of a beam of light from a heavenly body to said mirror and reflection of said beam to an observer, and a tilting mounting for said container.

26. An artificial horizon including a container transparent at least in part and having a spherical interior, a transparent liquid in said container, a mirror immersed in said liquid and horizontally disposed and centrally located in said container, and a body associated with said mirror for providing a large amount of inertia against tilting of the mirror, said body being substantially spaced from the interior surface of said container so as to diminish transmission of periodic motion from the container.

27. An artificial horizon comprising a container transparent at least in part, means for mounting the container for universal tilting motion, an optical reflecting element within the container, and means, including a body attached to the optical reflecting element, for yieldingly holding said element substantially level within the container at a point such that the center of gravity of the said body and optical reflecting element is relatively close to the center of tilting of the container despite oscillating tilting of the container, the tilting effect on said optical reflecting element of acceleration, deceleration and centrifugal force thus being minimized, optical means for observing an image of a heavenly body on said reflecting element, the device including a transparent liquid which substantially fills said container, acting to buoy the said body and to transmit light coming through the transparent container to said element and to transmit the reflection thereof toward said optical means.

In testimony whereof, I have signed my name to this specification this 14th day of February, 1929.

VANNEVAR BUSH.